(12) United States Patent
Kendziorra et al.

(10) Patent No.: US 11,453,256 B2
(45) Date of Patent: Sep. 27, 2022

(54) METHOD FOR PRODUCING A MATERIAL WEB, USE THEREOF AS A REINFORCING PLY FOR AN ELASTOMER ITEM, AND VEHICLE PNEUMATIC TIRES

(71) Applicant: Continental Reifen Deutschland GmbH, Hannover (DE)

(72) Inventors: Norbert Kendziorra, Garbsen (DE); Christian Weber, Garbsen (DE)

(73) Assignee: Continental Reifen Deutschland GmbH, Hannover (DE)

( * ) Notice: Subject to any disclaimer, the term of this patent is extended or adjusted under 35 U.S.C. 154(b) by 0 days.

(21) Appl. No.: 17/443,167

(22) Filed: Jul. 21, 2021

(65) Prior Publication Data

US 2021/0347213 A1 Nov. 11, 2021

Related U.S. Application Data

(63) Continuation of application No. 16/077,004, filed as application No. PCT/EP2016/081096 on Dec. 15, 2016, now abandoned.

(30) Foreign Application Priority Data

Feb. 9, 2016 (DE) ..................... 10 2016 201 926.0

(51) Int. Cl.
*B60C 19/08* (2006.01)
*B29D 30/38* (2006.01)
(Continued)

(52) U.S. Cl.
CPC .............. *B60C 19/08* (2013.01); *B29C 43/24* (2013.01); *B29C 43/28* (2013.01); *B29C 70/081* (2013.01);
(Continued)

(58) Field of Classification Search
None
See application file for complete search history.

(56) References Cited

U.S. PATENT DOCUMENTS 2,521,305 A 9/1950 Olson
3,244,572 A 4/1966 Nicol
(Continued)

FOREIGN PATENT DOCUMENTS

DE 1174493 B 7/1964
DE 1262578 A * 3/1968
(Continued)

OTHER PUBLICATIONS

Mechanics of Pneumatic Tires, ed. Samuel Clark, US Department of Transportation, Aug. 1981, pp. 216-219.

*Primary Examiner* — Jeffry H Aftergut
(74) *Attorney, Agent, or Firm* — David L. Cate; Gregory Adams

(57) ABSTRACT

The invention is directed to a vehicle pneumatic tire wherein strengthening plies are provided with steel cords running parallel to one another. The belt plies can be used, as isolated electrically conductive plates, for supplying electricity to electrical consumers such as sensors and actuators installed in the tire. Adjacent belt plies can be connected by puncture sensors to be able to identify damage to the belt caused by metallic parts penetrating from the outside, such as nails, on the basis of a change in the electrical resistance.

15 Claims, 1 Drawing Sheet

(51) Int. Cl.
    *B29D 30/70*     (2006.01)
    *B29C 43/28*     (2006.01)
    *B60C 9/20*     (2006.01)
    *B29C 43/24*     (2006.01)
    *B29C 70/50*     (2006.01)
    *B29C 70/08*     (2006.01)
    *B29K 105/10*     (2006.01)
    *B29K 105/14*     (2006.01)
    *B29K 105/12*     (2006.01)
    *B29K 105/08*     (2006.01)

(52) U.S. Cl.
    CPC .......... B29C 70/083 (2013.01); B29C 70/504 (2013.01); B29D 30/38 (2013.01); B29D 30/70 (2013.01); B60C 9/2006 (2013.01); *B29D 2030/381* (2013.01); *B29K 2105/0836* (2013.01); *B29K 2105/0845* (2013.01); *B29K 2105/101* (2013.01); *B29K 2105/106* (2013.01); *B29K 2105/12* (2013.01); *B29K 2105/14* (2013.01); *B29K 2995/0005* (2013.01); *B60C 2009/2061* (2013.01)

(56) References Cited

U.S. PATENT DOCUMENTS

| | | | | |
|---|---|---|---|---|
| 3,348,585 | A * | 10/1967 | Post | B29C 70/56 140/147 |
| 3,763,912 | A | 10/1973 | Bergomi et al. | |
| 3,889,121 | A * | 6/1975 | Bossen | G01N 23/083 250/359.1 |
| 3,900,627 | A * | 8/1975 | Angioletti | B65G 15/34 428/114 |
| 4,296,855 | A * | 10/1981 | Blalock | B29C 70/22 139/419 |
| 4,363,346 | A * | 12/1982 | Pepe | B60C 5/14 152/556 |
| 5,221,382 | A * | 6/1993 | Sid-Ahmed | B60C 9/0042 152/451 |
| 6,216,852 | B1 * | 4/2001 | David | B65G 15/36 198/847 |
| 8,869,857 | B2 | 10/2014 | Hinc | |
| 9,815,339 | B2 * | 11/2017 | Schunack | D06M 11/74 |
| 2011/0174420 | A1 | 7/2011 | Hinc | |
| 2011/0308675 | A1 | 12/2011 | Hinc et al. | |
| 2013/0056128 | A1* | 3/2013 | Kanz | B60C 19/08 152/548 |
| 2013/0174951 | A1 | 7/2013 | Schunack et al. | |
| 2015/0285334 | A1* | 10/2015 | Thomas | F16G 1/10 474/90 |

FOREIGN PATENT DOCUMENTS

| | | |
|---|---|---|
| DE | 1262578 B | 3/1968 |
| DE | 102010017444 A1 | 12/2011 |
| DE | 102010037004 A1 | 2/2012 |
| DE | 102011000361 A1 | 8/2012 |
| JP | 2008013879 A | 1/2008 |
| WO | 2012161238 A1 | 11/2012 |

\* cited by examiner

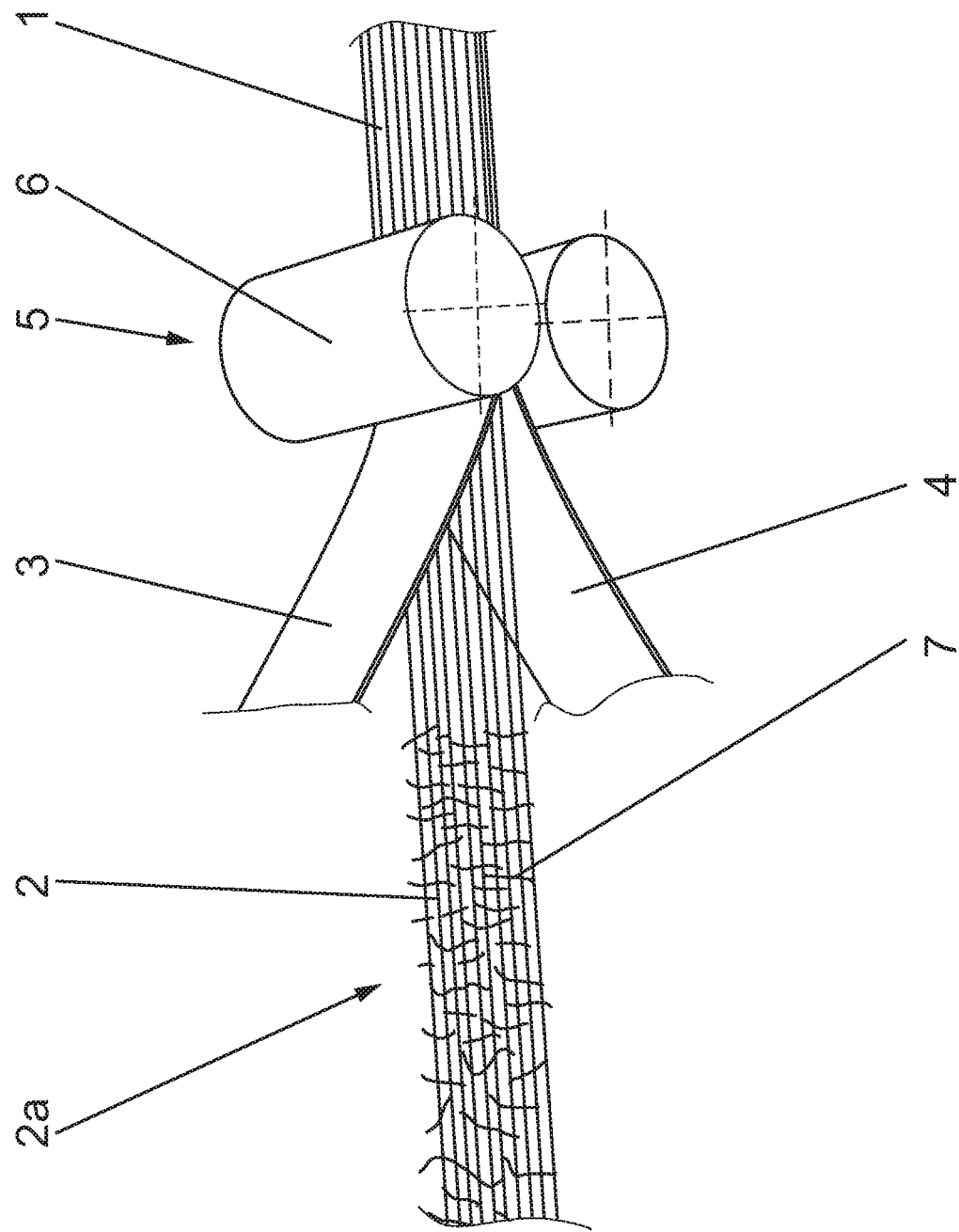

METHOD FOR PRODUCING A MATERIAL WEB, USE THEREOF AS A REINFORCING PLY FOR AN ELASTOMER ITEM, AND VEHICLE PNEUMATIC TIRES

CROSS REFERENCE TO RELATED APPLICATIONS

This Patent Application is a Continuation Application of, and claims priority to, U.S. Nonprovisional patent application Ser. No. 16/077,004 filed Aug. 9, 2018 as a continuation application of international patent application PCT/EP2016/081096, filed Dec. 15, 2016, both of which are incorporated herein in their entirety, by reference. This Patent Application also claims priority to German Patent Application No. 10 2016 201 926.0, filed Feb. 9, 2016, which is incorporated herein in its entirety, by reference.

FIELD OF THE INVENTION

The invention relates to a method for producing a material web composed of strengthening members, which are embedded into a rubber mixture and which run parallel to one another and which are composed of steel, having the following steps:
a) producing a rubber mixture web that forms an upper plate and a second rubber mixture web that forms a lower plate,
b) leading a strengthening member web, which is composed of a multiplicity of strengthening members running parallel to one another, under tension through the roll gap of a roll calender,
c) leading the upper plate from one side of the strengthening member web, and the lower plate from the other side of the strengthening member web, through the roll gap of the roll calender, with the upper plate and lower plate being joined together with the strengthening member web.

The invention also relates to the use of a material web produced in accordance with the invention.

BACKGROUND OF THE INVENTION

Material webs composed of strengthening members which are embedded in rubber mixtures, so-called rubberizing mixtures, and which run parallel to one another and which are composed of steel are used in particular for producing belt plies in pneumatic vehicle tires, but also for producing reinforcement plies in other elastomer articles, for example conveyor belts. The steel cords themselves are electrically conductive, but the electrical conductivity thereof cannot be utilized in the reinforcement ply, for example a belt ply of a pneumatic vehicle tire. Furthermore, the electrical conductivity of the rubberizing material is normally likewise very low, or the material is electrically non-conductive.

To produce an electrically conductive connection between an electrically non-conductive tread of a pneumatic vehicle tire, which comprises for example silica as filler material, and the wheel rim, it is known from U.S. Pat. No. 8,869,857 B2 to install in the tread a so-called "carbon center beam" which is in contact with an electrically conductive bottom plate, which in turn is in contact with electrically conductive elements running in encircling fashion in a circumferential direction on the belt plies and with a further electrically conductive element running on the carcass, the latter element in turn making contact with the wheel rim. The electrically conductive elements may be narrow strips of electrically conductive rubber material.

SUMMARY OF THE INVENTION

The invention is based on the object of making it possible to use strengthening plies provided with steel cords running parallel to one another, in particular belt plies in pneumatic vehicle tires, as isolated electrically conductive plates, such that, for example, belt plies can be used for example for supplying electricity to electrical consumers, such as sensors, actuators and the like, installed in the tire, or adjacent belt plies can be connected by means of puncture sensors in order to be able to identify damage to the belt caused by metallic parts penetrating from the outside, such as for example nails, on the basis of a change in the electrical resistance.

The stated object is achieved according to the invention in that the strengthening member web is, before or as it enters the roll gap, provided with a multiplicity of filaments which produce contact between at least some of the strengthening members at least substantially transversely with respect to the direction of extent of the strengthening member web, which filaments are composed of electrically non-conductive textile carrier filaments provided with a coating composed of an electrically conductive material.

When passing through the roll calender, the coating of the filaments bonds to the rubber material of the upper and lower plate and thus forms a multiplicity of electrically conductive passages between a number of strengthening members in each case. Here, the electrically non-conductive carrier filaments serve merely for "transferring" the electrically conductive coating into the rubber mixture; their mechanical characteristics, for example their strength, are not of significance. The carrier filaments may readily break or be destroyed during the calendering process and/or during the use of the vulcanized product, for example of the pneumatic vehicle tire. It is essential that electrically conductive passages embedded in the rubber material are formed, such that for example belt plies can function as electrically conductive "plates". For example, puncture sensors are thus capable of identifying, on the basis of the change in the electrical resistance, whether for example a metallic object has penetrated into the belt assembly.

There are numerous possibilities in the context of the invention for connecting the strengthening members of the strengthening member web by means of electrically conductive filaments.

In a preferred embodiment of the invention, a multiplicity of individual filaments is placed onto the strengthening member web before the latter enters the roll gap. This measure can be performed easily and in an automated manner.

In a further configuration variant, a woven fabric or a knit composed of the filaments is supplied together with the strengthening member web to the roll gap of the roll calender. The woven fabric or knit can be supplied analogously to the upper plate and the lower plate between the plates of the roll gap, and therefore likewise in a simple manner. According to the invention, the woven fabric or knit has a width which at least substantially corresponds to the width of the strengthening member web.

In a yet further configuration variant according to the invention, the filaments are woven as individual filaments with the strengthening members. This alternative, too, can be incorporated as an automatically performed measure into the production of the material web, for example by virtue of the strengthening member web being led over a creel which serves to alternately lift some strengthening members. The electrically conductive filaments may be placed between the lifted and the non-lifted strengthening members.

In alternatives of the invention, in which individual filaments are used, the length of the filaments preferably amounts to from 2 cm to 10 cm. To ensure as complete and uniform an electrically conductive connection between the strengthening members, the filaments are, according to the invention, placed on or woven in such that successive filaments in a direction of extent of the strengthening member web are in each case only partially positioned on the same strengthening members.

The electrically conductive filaments may also be of different configuration. In one possible configuration variant of the invention, the electrically conductive coating of the carrier filaments comprises or is composed of electrically conductive particles, such as for example carbon black particles, graphite powder or carbon nanotubes.

In a further preferred embodiment of the invention, the coating of the carrier filaments is composed of an elastomeric material.

In a further particularly preferred embodiment of the invention, the electrically conductive coating is an adhesion promoter, preferably an RFL dip.

A material web produced in accordance with the invention is, in a preferred configuration variant, used for producing a reinforcement ply in an elastomer article. The reinforcement ply may advantageously be a belt ply of a pneumatic vehicle tire.

The invention furthermore relates to a pneumatic vehicle tire which has at least two belt plies which are based on a material web produced in accordance with the method according to the invention.

BRIEF DESCRIPTION OF THE DRAWING

The invention will now be described with reference to the single FIGURE of the drawing (FIG. 1) which shows a method stage during the production of a material web for a reinforcement ply.

DESCRIPTION OF THE PREFERRED
EMBODIMENTS OF THE INVENTION

The material web 1 produced in accordance with the method according to the invention comprises a multiplicity of strengthening members 2 which run parallel to one another and which are composed of steel, in particular steel cords of conventional construction, which are embedded into a rubber mixture. If the material web 1 is used for producing a belt ply in a belt assembly of a pneumatic vehicle tire, the number of strengthening members 2 per decimeter width of the belt ply amounts to for example 90 to 120. In belt plies, the strengthening members 2 normally run at a certain angle with respect to the circumferential direction of the pneumatic vehicle tire, such that the material web 1 is trimmed correspondingly. The rubber mixture in which the strengthening members 2 are embedded is referred to as rubberizing mixture and, as shown in FIG. 1, is produced from two rubber mixture plates, an upper plate 3 and a lower plate 4, which are rubber mixture webs produced by calendering. The upper plate 3 and the lower plate 4 are led through the roll gap of a roll calender 5, wherein the strengthening members 2 running parallel to one another are led, under tension, through the roll gap between the upper plate 3 and the lower plate 4. Downstream of the roll calender 5, which is illustrated in this case by way of example with two calender rolls 6, the material web 1 composed of strengthening members 2 that have been rubberized on both sides exits the roll calender 5.

Before entering the roll gap, the strengthening members 2 running parallel to one another form a strengthening member web 2a, onto which electrically conductive filaments 7 are placed substantially transversely with respect to the longitudinal extent of the strengthening members 2. The electrically conductive filaments 7 may be of substantially equal length, or may have different lengths in the range of a few centimeters, in particular from 2 cm to 10 cm. The filaments 7 are placed on such that successive filaments 7 in a direction of extent of the strengthening member web 2a are in each case as far as possible only partially positioned on the same strengthening members 2. Here, the filaments 7 do not need to be placed on rectilinearly, but rather may be placed on in a somewhat random arrangement. The filaments 7 may be placed on without or with points of contact with one another. By means of the multiplicity of filaments 7, contact is produced between different sets of strengthening members 2 by filaments 7 over the length of the strengthening member web 2a.

In a further configuration variant that is not illustrated, a woven fabric or knit composed of electrically conductive filaments is supplied together with the strengthening member web, between the upper plate 3 and lower plate 4, to the roll gap of the roll calender 5.

Alternatively, individual electrically conductive filaments may be woven into the strengthening members 2 transversely with respect to the direction of extent of the strengthening member web 2a. For this purpose, the strengthening member web 2a may be led over a creel which serves to alternately lift some strengthening members, such that the electrically conductive filaments can be placed, for example "fired in", between the lifted and the non-lifted strengthening members 2.

In a preferred embodiment of the invention, the electrically conductive filaments 7 are composed in each case of a carrier filament composed of an electrically non-conductive material, which has an outer coating or shell is composed of an electrically conductive, preferably elastomeric material. The electrically conductive coating of the carrier filaments may also be composed of electrically conductive particles, for example graphite powder or carbon nanotubes. The carrier filaments may for example be composed of rayon, polyester, polyamide or aramid and may be a monofilament, a yarn or a cord composed of multiple yarns. The electrically conductive coating is based, for example, on a suspension comprising latex or another elastomer and including electrically conductive particles, for example carbon black particles or graphite powder, which ensures the electrical conductivity of the coating. This coating can be produced by using, for example, a conventional adhesion promoter comprising carbon black particles, which is liquid to such an extent that the carrier filament composed of textile material can be coated by means of a dipping operation. Use may for example be made of an RFL dip (resorcinol-formaldehyde latex dip) incorporating carbon black particles, in particular N 339 particles or N 121 particles. The proportion of electrically conductive particles in the suspension is for example 10% by weight to 70% by weight, in particular 30% by weight to 50% by weight. The filament produced as endless filament and provided with an electrically conductive coating is cut into correspondingly shorter filaments 7.

During the calendering process in the roll calender 5, the coating of the filaments 7 is embedded into the rubber material of the upper plate 3 and of the lower plate 4, such that electrically conductive passages are formed in the rubber material, which passages in each case connect a number of strengthening members 2 to one another in electrically conductive fashion. During the subsequent vulcanization of the elastomer article, for example of the pneumatic vehicle tire, the passages are retained. The carrier filaments may readily be damaged or destroyed during the further processing of the material web 1; the mechanical strength thereof is not of significance. Any ends of the filaments 7 that protrude at the lateral edges of the calendered material web 1 can be cut off.

It is understood that the foregoing description is that of the preferred embodiments of the invention and that various changes and modifications may be made thereto without departing from the spirit and scope of the invention as defined in the appended claims.

LIST OF REFERENCE NUMERALS

1 . . . Material web
2 . . . Strengthening member
2a . . . Strengthening member web
3 . . . Upper plate
4 . . . Lower plate
5 . . . Roll calender
6 . . . Calender roll
7 . . . Filaments

We claim:

1. A method for producing an elastomeric article comprising a material web composed of strengthening members, which are embedded into a rubber mixture and which run parallel to one another and which are composed of steel, the method comprising:
   a) producing a rubber mixture web that forms an upper plate and a second rubber mixture web that forms a lower plate;
   b) leading a strengthening member web, which is composed of a multiplicity of strengthening members running parallel to one another, under tension through a roll gap of a roll calender;
   c) leading the upper plate from one side of the strengthening member web, and the lower plate from the other side of the strengthening member web, through the roll gap of the roll calender, with said upper plate and lower plate being joined together with the strengthening member web;
   d) providing the strengthening member web with a multiplicity of filaments before or as it enters the roll gap; and
   e) incorporating the material web in an elastomer article as an isolated electrically conductive plate adjacent a second isolated electrically conductive plate,
   wherein the multiplicity of filaments produce contact between in each case at least some of the strengthening members at least substantially transversely with respect to the direction of extent of the strengthening member web,
   wherein the multiplicity of filaments comprise electrically non-conductive textile carrier filaments provided with a coating composed of an electrically conductive material, and
   wherein the material web and the second isolated electrically conductive plate conduct electricity.

2. The method according to claim 1, wherein the multiplicity of filaments is placed onto the strengthening member web before the latter enters the roll gap.

3. The method according to claim 1, wherein a woven fabric or knit composed of the filaments is supplied together with the strengthening member web to the roll gap of the roll calender.

4. The method according to claim 2, wherein the multiplicity of filaments have a length which corresponds at most to the width of the strengthening member web.

5. The method according to claim 1, wherein the multiplicity of filaments are woven as individual filaments with the strengthening members.

6. The method according to claim 5, wherein the width of the woven fabric or knit at least substantially corresponds to the width of the strengthening member web.

7. The method according to claim 2, wherein the multiplicity of filaments have a length of from 2 cm to 10 cm.

8. The method according to claim 2, wherein the filaments are placed on or woven in such that successive filaments in the direction of extent of the strengthening member web are in each case only partially positioned on the same strengthening members.

9. The method according to claim 1, wherein the electrically conductive coating of the carrier filaments comprises or is composed of electrically conductive particles selected from the group consisting of carbon black particles, graphite particles and carbon nanotubes.

10. The method according to claim 1, wherein the coating of the carrier filaments consists of an elastomeric material.

11. The method according to claim 1, wherein the electrically conductive coating is an adhesion promoter.

12. The method according to claim 1, wherein the carrier filaments are composed of rayon, polyester, polyamide or aramid.

13. The method according to claim 1, wherein the material web is a reinforcement ply for the elastomeric article.

14. The method according to claim 13, wherein the reinforcement ply is a belt ply of a pneumatic vehicle tire.

15. The method according to claim 14, wherein the tire comprises a belt assembly further comprising one or more puncture sensors electrically connected to one or more of the electrically conductive plates.

* * * * *